(12) United States Patent
Male

(10) Patent No.: US 6,531,899 B1
(45) Date of Patent: Mar. 11, 2003

(54) INTEGRATED DIFFERENTIAL CURRENT COMPARATOR WITH INPUT TO OUTPUT ELECTRICAL ISOLATION

(75) Inventor: Barry Jon Male, West Granby, CT (US)

(73) Assignee: Texas Instruments Incorporated, Dallas, TX (US)

( * ) Notice: Subject to any disclaimer, the term of this patent is extended or adjusted under 35 U.S.C. 154(b) by 0 days.

(21) Appl. No.: 10/033,565

(22) Filed: Dec. 27, 2001

(51) Int. Cl.[7] .............................................. H03K 17/00
(52) U.S. Cl. ..................... 327/100; 327/512; 327/562
(58) Field of Search ............................ 327/63, 65, 100, 327/512, 560, 561, 562, 563

(56) References Cited

U.S. PATENT DOCUMENTS

| 3,393,328 | A | * | 7/1968 | Meadows et al. ............ 327/512 |
| 4,757,528 | A | * | 7/1988 | Falater et al. ................ 379/412 |
| 5,229,578 | A | * | 7/1993 | Kusano et al. ............... 219/497 |
| 5,435,180 | A | * | 7/1995 | Uchiyama et al. ......... 73/204.19 |
| 6,054,892 | A | * | 4/2000 | Miles et al. ................. 327/512 |
| 6,326,858 | B1 | * | 12/2001 | Strnad ...................... 331/107 R |

* cited by examiner

*Primary Examiner*—Jeffrey Zweizig
(74) *Attorney, Agent, or Firm*—W. Daniel Swayze, Jr.; W. James Brady; Frederick J. Telecky, Jr.

(57) ABSTRACT

An isolated integrated differential current comparator for comparatively measuring the current passing through one or two resistors using a thermal difference sensor employing the Seebeck effect in an integrated circuit that is coupled to the resistors. The thermal difference sensor detects the temperature difference between the resistors, which is proportional to the square of the current passing through them. The output of the current comparator is electrically isolated from the inputs. The output is scalable and in circuit topologies requiring full signal isolation. The integrated differential current comparator is applicable to hot swap applications and applications where isolation of a number of signals is needed.

25 Claims, 12 Drawing Sheets

US 6,531,899 B1

INTEGRATED DIFFERENTIAL CURRENT COMPARATOR WITH INPUT TO OUTPUT ELECTRICAL ISOLATION

CROSS REFERENCE TO RELATED APPLICATIONS

N/A

STATEMENT REGARDING FEDERALLY SPONSORED RESEARCH OR DEVELOPMENT

N/A

BACKGROUND OF THE INVENTION

The present invention relates generally to electrical isolation between circuit functions in an integrated silicon device. More specifically, the invention relates to the transmission of DC and AC information across a dielectric barrier using a temperature transducer.

Thermocouples are commonly used as temperature sensors. A thermocouple is composed of two touching dissimilar metals forming a sensing junction. When the sensing junction is held at a temperature different from the open ends of the metal, an open-circuit voltage, which is a function of the temperature difference, is created. This thermo-electric voltage is known as the Seebeck voltage. By measuring a thermocouple's voltage, the temperature can be calculated. When two sensing junctions are connected in series, a differential thermocouple is formed and the open-circuit voltage, $V_s$ is proportional to the temperature difference between the two junctions, $V_s=kV(\Delta T)$, where kV is a millivolts per degree change constant for the particular set of metals used. Thermocouples are traditionally formed as cable assemblies that are strung to temperature generating points remote from the measuring station.

Many applications require electrical isolation between circuit functions. While many methods of performing this electrical isolation exist in discrete circuitry, there are relatively few methods to obtain isolation in an integrated silicon device. For example, differential capacitive and inductive devices encased within the inter-metal dielectric of the die or package have been utilized. These approaches require significant circuitry to process the coupled information. In addition, because these components require time varying signals, direct coupling of DC signals across the isolation barrier is not possible without additional circuit complexity.

A means to isolate circuit functions in an integrated circuit that responds to both AC and DC signals without complex circuitry is desirable.

BRIEF SUMMARY OF THE INVENTION

A differential isolated current comparator achieves isolation using integrated thermo-electric devices and generated thermal gradients. This comparator forms a fundamental cell, which can be scaled for a multitude of new applications. This cell allows for isolation of a measured current, measured voltage or an output voltage from the remainder of the circuitry.

An integrated differential current comparator is formed on a silicon die for providing input to output electrical isolation. The comparator includes a first resistor disposed between a first contact point and a second contact point, the first resistor proximate to the silicon, die. The first resistor generates a first temperature when a first current passes between the first contact point and the second contact point. A second resistor is disposed between a third contact point and a fourth contact point, the second resistor spaced apart from the first resistor and proximate to the silicon die. The second resistor generates a second temperature when a second current passes between the third contact point and the fourth contact point. A thermal difference sensor is disposed on the silicon die. The thermal difference sensor has a first temperature junction thermally coupled to the first resistor and a second temperature junction thermally coupled to the second resistor. The thermal difference sensor provides an output signal that is a function of the temperature difference between the first resistor and the second resistor. Dielectric barriers are interposed between the first temperature junction and the first resistor, and the second temperature junction and the second resistor respectively.

Other aspects, features, and advantages of the present invention are disclosed in the detailed description that follows.

BRIEF DESCRIPTION OF THE SEVERAL VIEWS OF THE DRAWING

The invention will be understood from the following detailed description in conjunction with the drawings, of which.

DETAILED DESCRIPTION OF THE INVENTION

Figure 1:
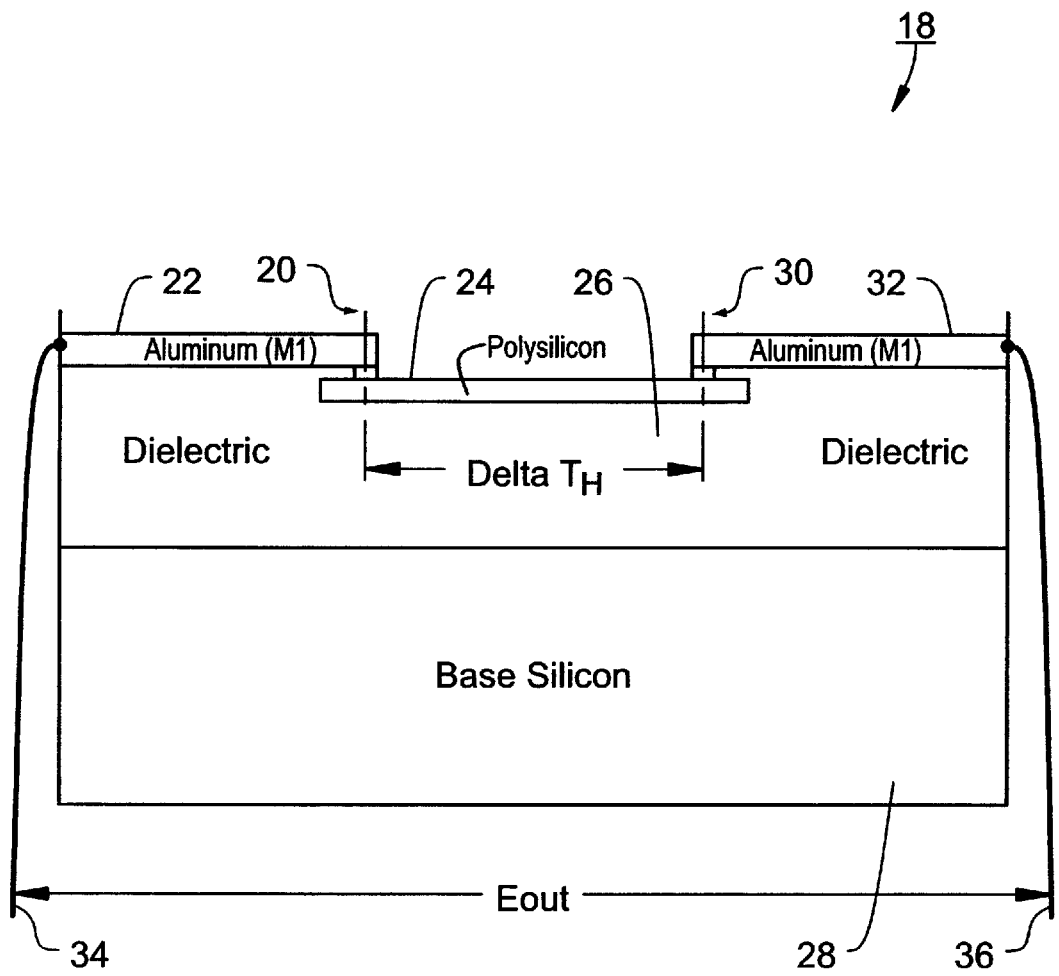
FIG. 1 is a cross section of a thermo-electric sensor formed on a silicon base according to the invention.

A Seebeck effect device, a temperature transducer 18, may be implemented in an integrated semiconductor device utilizing the structure illustrated in cross section in FIG. 1. In the figures herein, a silicon die is illustrated and discussed although the techniques taught are applicable to semiconductor devices in general. In FIG. 1, a dielectric layer 26 separates a base silicon layer 28 from a pair of Seebeck junctions 20 and 30. First junction 20 is formed of a first conductor 22 contacting a second, different material, conductor 24 at first junction 20. Second junction 30 is formed of a third conductor 32 contacting the second conductor 24 at a second junction 30 spaced apart from the first junction 20. If the junctions 20 and 30 are held at different temperatures, a voltage $E_{out}$ is developed across the ends 34, 36 of the first and third conductors 22, 32. The pair of junctions 20, 30 are referred to as a Seebeck pair. The temperature transducer 18 generates an output voltage without the requirement for biasing. The voltage output of this transducer 18 is directly proportional to the temperature difference between the junctions 20, 30 and does not have any DC offset.

The materials chosen for the distinct conductors determines the proportionality variable. In an embodiment where the first and third conductors 22, 32 are implemented with aluminum and the second conductor 24 is implemented with polysilicon, the thermal-EMF (electro-motive force) of the polysilicon-aluminum transducer 18 is about 0.7 mV/C. The embodiment utilizing aluminum and polysilicon is advantageous because the sensor can be integrated above field oxide, without any silicon diode junctions. This is particularly important as silicon diode junctions represent either an isolation voltage standoff limitation or a conductive path when the junctions become forward biased.

Figure 2:
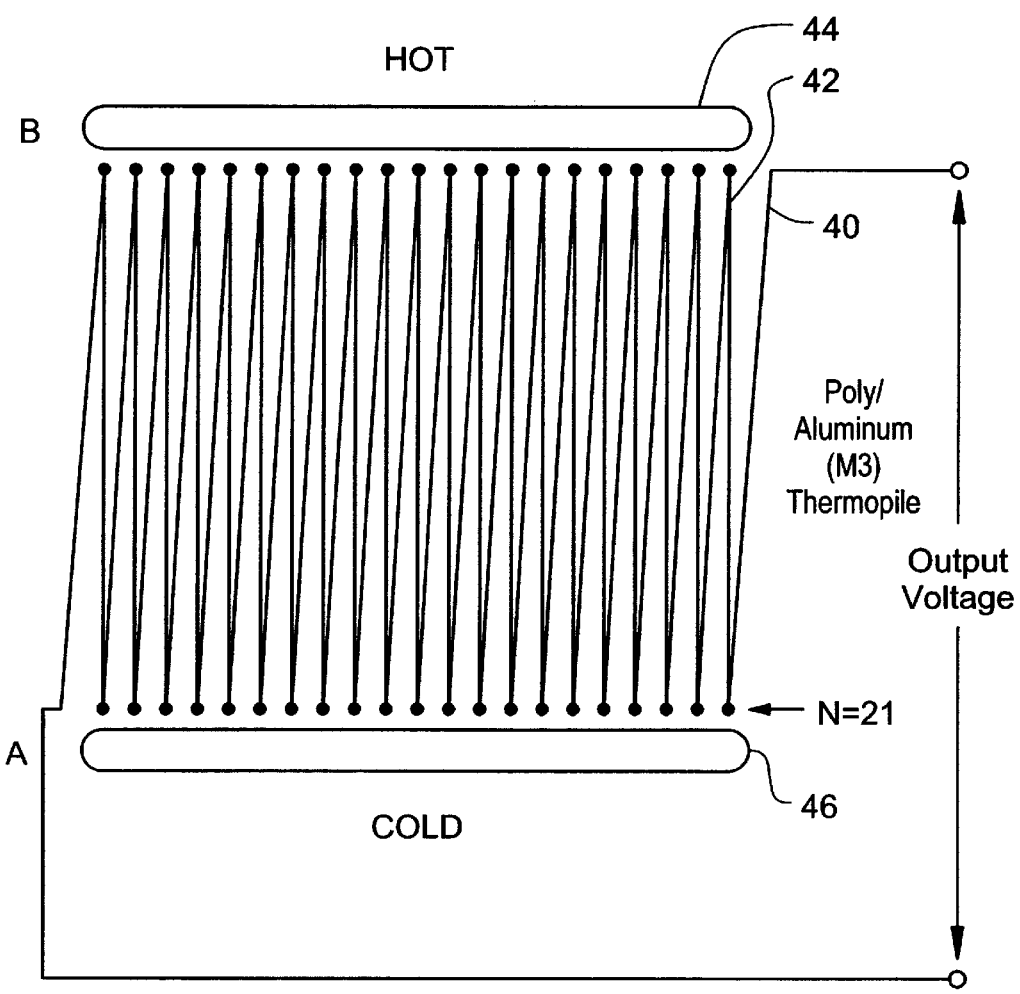
FIG. 2 is a symbolic top view of a thermo-electric device formed on a silicon base according to the invention.

The gain of the temperature transducer 18 of FIG. 1 can be increased by connecting a number of Seebeck pairs, experiencing the same temperatures, in series. FIG. 2 illustrates a symbolic top view of a thermopile—a layout of a series of connections that increases the gain by a factor N, where N is the number of junction pairs in series that experience the same temperature difference. In FIG. 2, vertical lines 42 represent first conductors and angled lines 40 represent second conductors. Structure 44 (B) maintains a temperature $T_{44}$ that is "hot" relative to the temperature $T_{46}$ maintained by structure 46 (A). There are (N=21) pairs of junctions in series in FIG. 2 so, for an aluminum/polysilicon embodiment, the output voltage is $[(21*0.7 mv)/C]*(T_{44}-T_{46})$.

Figure 3:
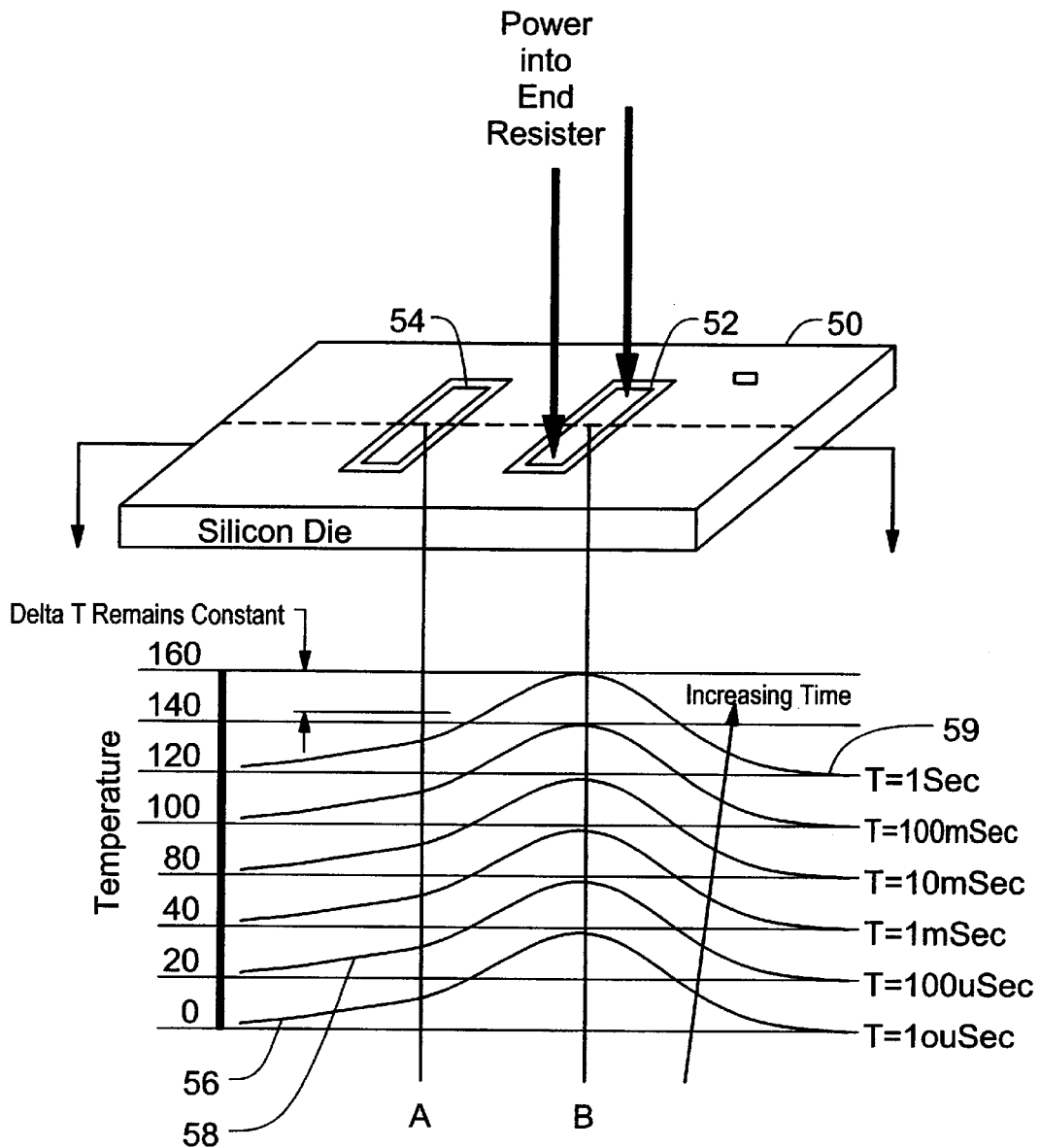
FIG. 3 illustrates the relationship between time and temperature within a silicon die.

FIG. 3 illustrates the thermal profile of a silicon die 50 as power is applied and in particular as one resistor 52 is heated by carrying current while another resistor 54 does not. Trace 56 illustrates the temperature profile taken 10 µsec after power turn-on showing that area B near resistor 52 rises to a high temperature (~40° C.) almost immediately. The temperature in area A near resistor 54 exhibits some rise in temperature (~20° C.) due to its proximity to region B, while the temperature at the regions near the edges of the die remain at approximately 0° C. At time=100 µsec, as shown by trace 58, the whole die has heated up to 20° C., while regions A and B have maintained the same relative differential to each other and to the die as a whole. Within one second, as shown on trace 59, the die has stabilized at a temperature of 120° C. with region B reaching 160° C. and region B 140° C. The heat-generating resistor generates a temperature differential that is identifiable regardless of the die temperature.

Figure 4:
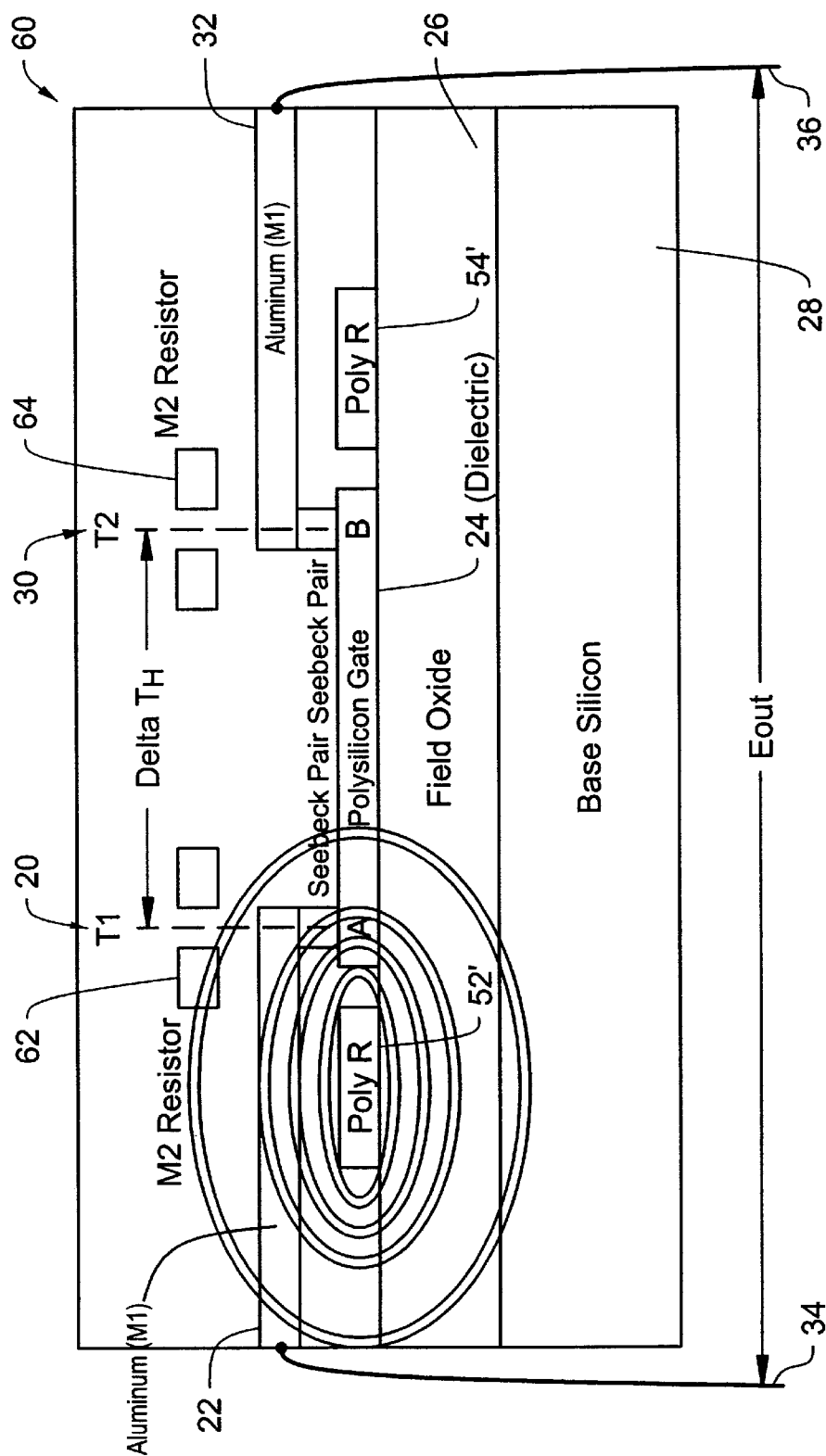
FIG. 4 is a cross section of an embodiment of an isolated differential thermo-electric device according to the invention.

A structure that utilizes the temperature gradient of a resistor carrying current and a Seebeck pair to form a current comparator 60 is shown in cross section in FIG. 4. In FIG. 4, the basic structure of FIG. 1 is augmented by end resistors positioned near the Seebeck junctions A and B, where the current through the resistors is understood to flow orthogonal to the page. The resistors are positioned in close proximity to the Seebeck junctions A and B, but isolated from the junctions by a dielectric material. The resistors in one embodiment are implemented as semiconductor structures such as polysilicon resistors 52' and 54' embedded in the dielectric layer 28 near the junctions A and B. Alternately, the end resistors are implemented as metal resistors 62 and 64 in an inter-metal dielectric layer above the highest layer of the temperature transducer 18. A temperature gradient between junctions A and B is created by energizing one resistor in close proximity to one junction. Alternately, a temperature gradient between junctions A and B is established by energizing both resistors, but with different currents. Polysilicon and Metal 2 resistors are shown in the embodiment illustrated as these materials keep the resistors above the field oxide layer, although similar materials may be substituted to suit alternate semiconductor processes as is known in the industry. Current in the left resistor 52' or 62 of FIG. 4 creates a positive output voltage across the terminals 34, 36 of the comparator 60. Current in the right side resistor 54' or 64 reverses the output polarity. The net effect is a current comparator or current controlled voltage source. This current comparator is a power measurement device as small differences of low level signals do not cause sufficient temperature difference to generate a significant voltage. When the resistors and associated sensing junctions are spaced further apart, the reduced thermal leakage path allows larger temperature differences to be maintained between the measurement points.

Figure 5:
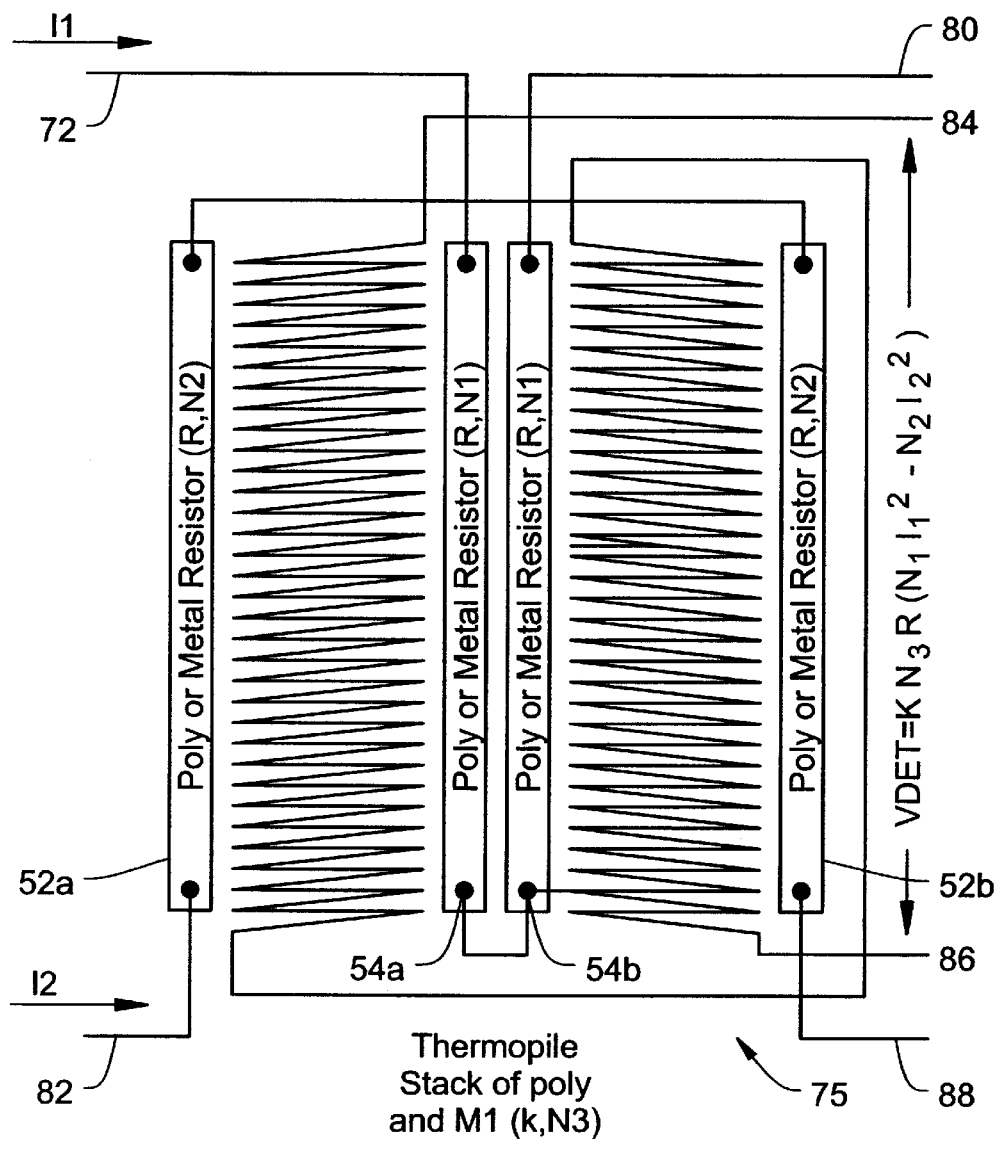
FIG. 5 is a symbolic top view of a layout of multiple thermo-electric devices, such as those of FIG. 4, arrayed to reduce thermal interference.

The structure of FIG. 4 forms a fundamental comparator cell 60 whose gain is increased by connecting multiple cells in series as previously discussed. FIG. 5 illustrates a symbolic top view of a layout that connects multiple cells while reducing or substantially eliminating the sensitivity of a resultant comparator 75 to external temperature gradients. The orientation of the resistors 52a/52b and 54a/54b creates a set of cold and hot junctions ABBA (FIG. 3) that cancel out a signal generated by die temperature gradients while measuring the temperature difference between the resistors. Input current $I_1$ passes from input 72 to output 80 heating resistor 54a/54b whose resistance is determined by the resisitivity per unit length R times the length of N1. Similarly, input current I2 passes from input 82 to output 88 heating resistor 52a/52b whose resistance is determined by the resisitivity per unit length R times the length of N2. Serially connected comparator cells 60 develop a voltage $V_{det}$ across the terminals 84, 86 expressed as:

$$V_{DET}=kN3R(N1I_1^2-N2I_2^2)$$

where k is the thermal-EMF of the materials selected for the conductors and N3 is the number of comparator cells 60 in the comparator 75.

Figure 6:
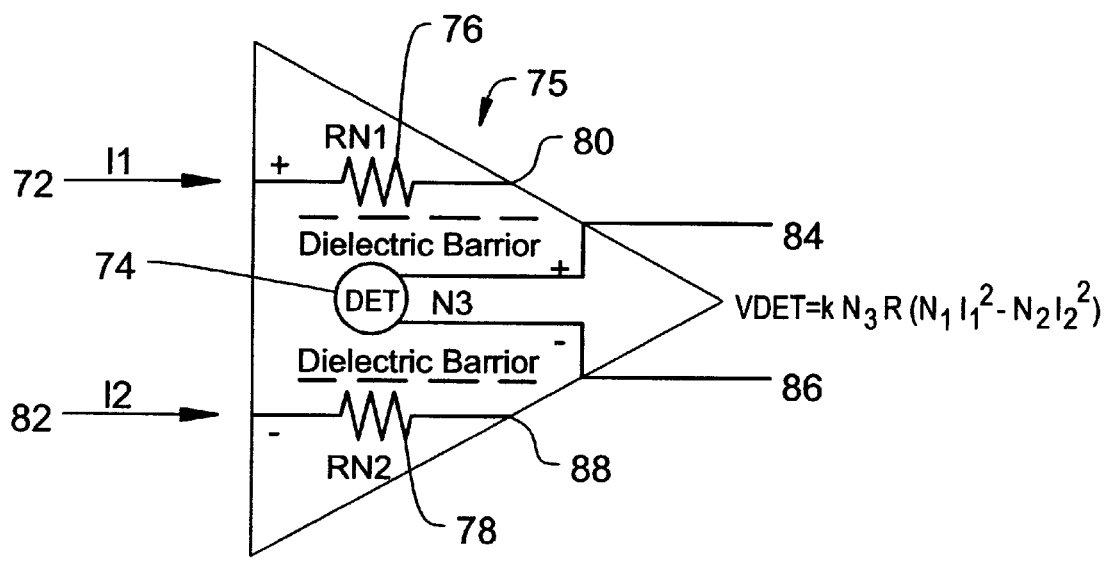
FIG. 6 illustrates a symbol for the isolated differential thermo-electric device of FIG. 5.

The comparator 75 can be represented schematically as shown in FIG. 6. The output voltage across pins 84 and 86 $V_{DET}=kN3R(N1I_1^2-N2I_2^2)$ responds to power dissipation, therefore the output is a function of the square of the input currents $I_1$ and $I_2$. The polarity of the currents is irrelevant. The power of each input 72, 82 is scaled directly with the sizing of the end resistors RN1, RN2 and the overall gain is controlled by N3, the number of thermopiles. Response characteristics of this device are generally in the µsecond range. Local thermal gradients on the die establish themselves in this timeframe, as shown in FIG. 3. The response time can be improved by pulsing the power into the resistors RN1 and RN2 at a high level for a short duration, in the order of microseconds, and then returning the power to a nominal steady state level. The integrated differential isolated current comparator 75 transmits DC or AC information across a dielectric barrier. It does not require biasing to generate its output and as such can be used to process isolated input information or to provide an isolated output drive signal.

Figure 7:
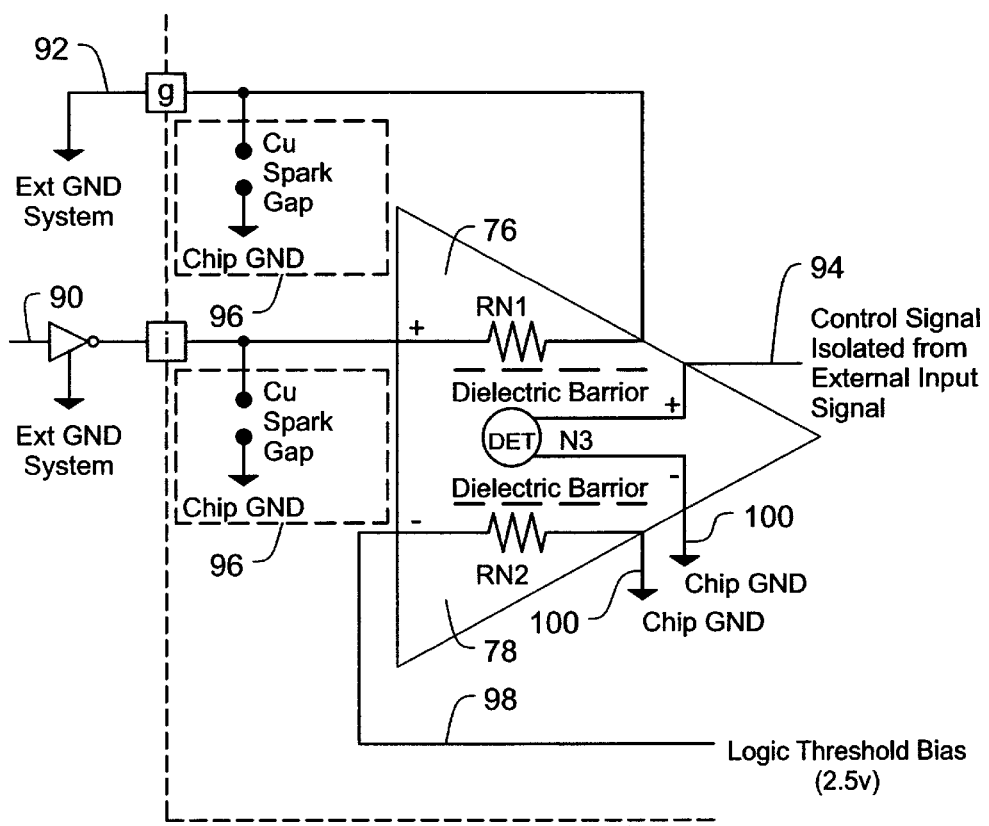
FIG. 7 is a circuit diagram of an input signal isolator using the of the thermo-electric device of FIG. 6.

The comparator 75 may be used as a control signal isolator as shown in FIG. 7. The two connections to resistor RN1 are brought out of the integrated circuit at pins g and i in this application. When a control signal 90 causes current to flow in resistor RN1, the temperature $T_1$ generated thereby is compared against a reference temperature $T_2$ set by a logic threshold bias voltage 98 through resistor RN2. When $T_1$ exceeds $T_2$ by sufficient margin, isolated control signal 94 is brought high. Note that all of comparator 75 except the control inputs g,i are referenced to a integrated circuit ground 100. The isolation provided by the dielectric layer is sufficient to allow voltages as large as 1500V between the control inputs and integrated circuit ground. To prevent oxide breakdown of the isolated circuits during electrostatic discharge (ESD) or other high voltage events, robust spark gaps 96 are utilized between the isolated pins and the circuit/substrate ground 100. The spark gaps 96 are in one embodiment made of copper.

Figure 8:
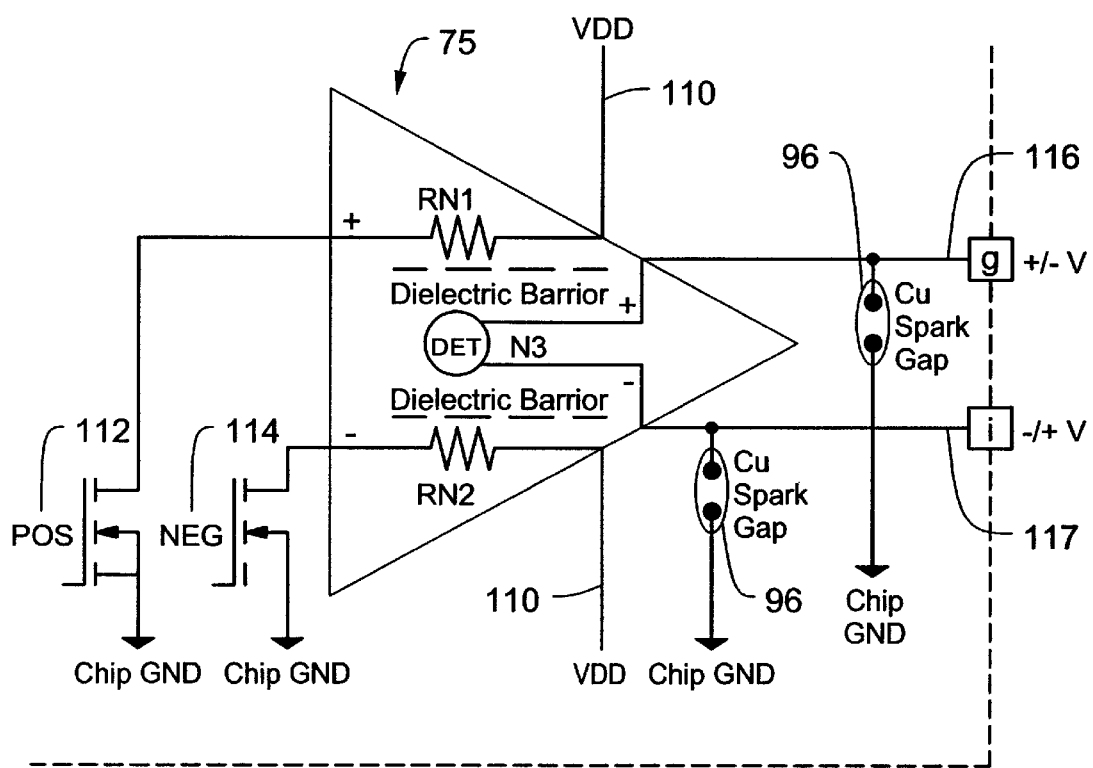
FIG. 8 is a circuit diagram of an isolated voltage driver using the thermo-electric device of FIG. 6.

The comparator 75 may also be used as an isolated bipolar voltage generator as shown in FIG. 8. Depending on the state of the inputs 112, 114, that are typically driven from a controller, comparator 75 will generate either a positive or a negative voltage between the outputs 116, 117. The outputs 116, 117 are protected by spark gaps 96.

Figure 9:
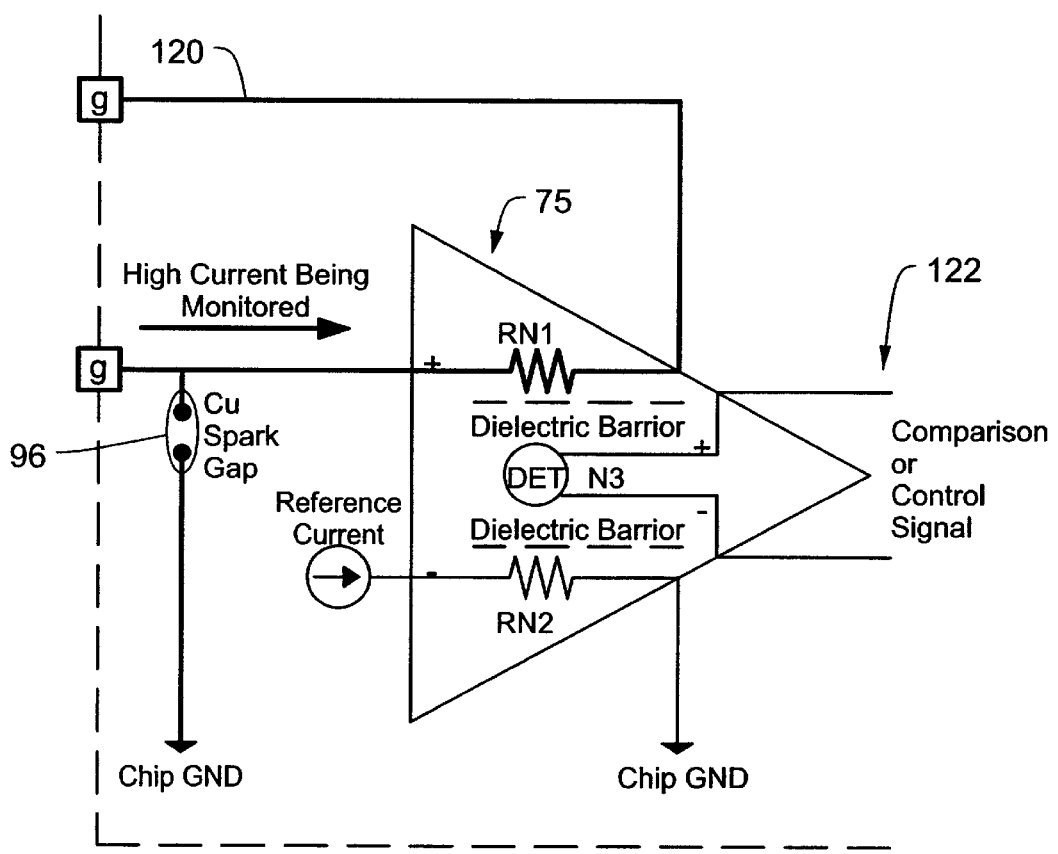
FIG. 9 is a circuit diagram of a current comparator using the thermo-electric device of FIG. 6.

The comparator 75 may also be used for isolated high current sensing as illustrated in FIG. 9. In FIG. 9, resistor RN1 has a small value relative to resistor RN2. Therefore, only a high current on the connection 120 through RN1 will be detected and cause the outputs 122 to change state. This function is useful in 10 detecting overcurrent and shutting down a system, such as in hot swapping or in other applications that control components of power systems. This application could be extended to perform isolated feedback for voltage or current linear control by adding a linear control loop.

Figure 10:
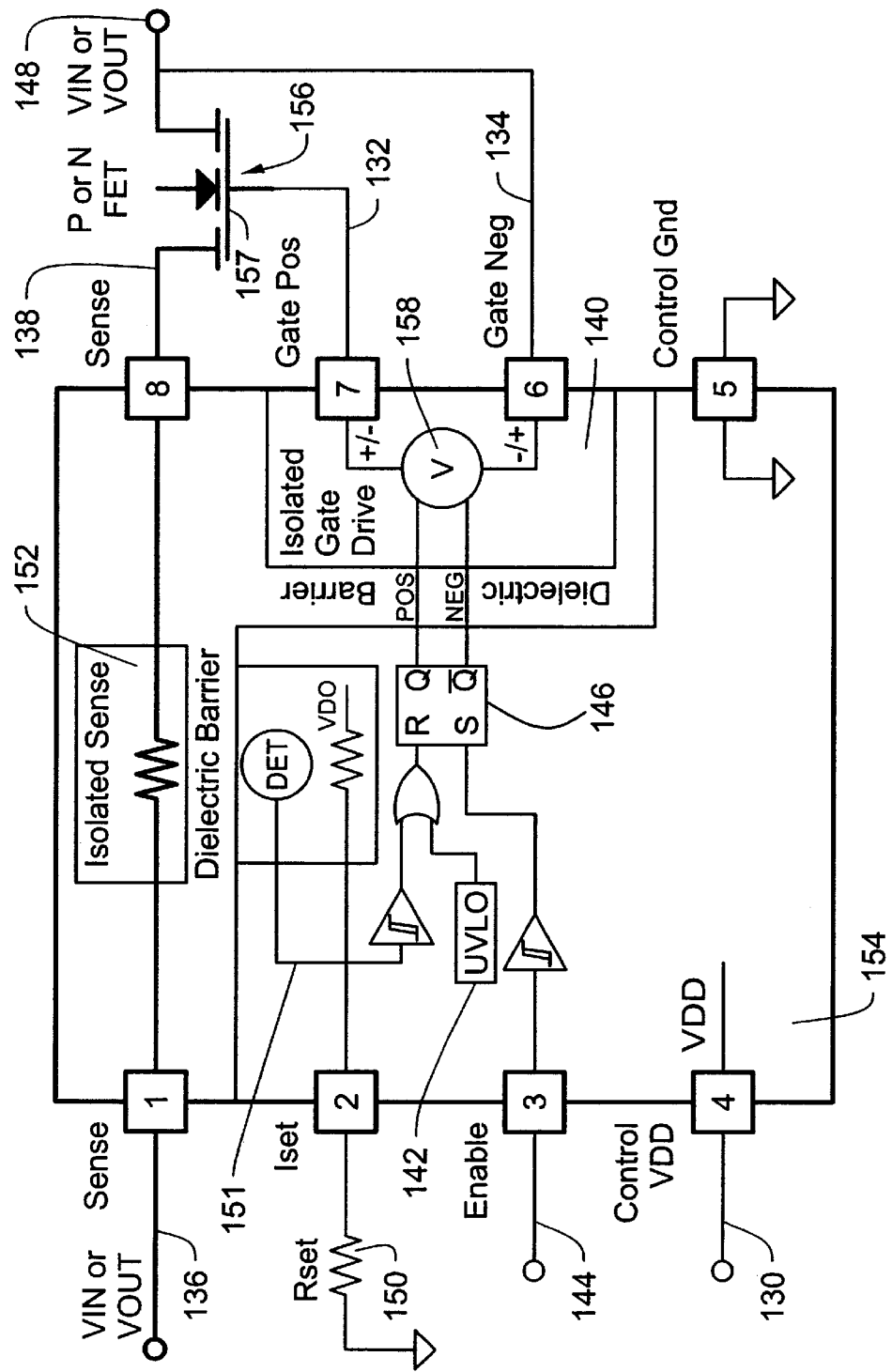
FIG. 10 is a block diagram of an integrated circuit to provide a power switch control capability implemented using an embodiment of the invention.

The comparator 75 may be incorporated into an integrated circuit providing a simple and flexible design for totally isolated power switch control applications, such as hot swapping, as shown in FIG. 10. Equipment that allows hot swapping is configured to allow devices to be connected while the equipment is powered on. This design provides complete electrical isolation among a control input 144 included in a bipolar gate drive interface region 154, a current sense interface 152 and a switched bus 132, 134 in an isolated gate drive region 140. Because of the fast response, the hot-swap can detect overcurrent situations to protect many circuits. An external N or P MOSFET 156 can be used by the proper connection of GATEPOS 132 and GATENEG 134 pins to control the application of voltage to the device. An internal undervoltage lockout (UVLO) 142 ensures that an adequate VDD supply is present before enables 144 are allowed. In the absence of VDD power 130, a short is maintained across the external MOSFET's gate 157 and source 148. The presence of VDD power 130 charges the MOSFET gate 157 to a reverse potential. A logic high on the enable pin 144 sets the enable latch 146 and starts charging th e MOSFET gate 157 to a positive potential. The magnitude of current flowing through the SENSE pins 136, 138 is monitored by the comparator 151. The trip current is set by the value of resistor RSET 150 according to the formula:

$$I_{trip} = 1000 * VDD/RSET$$

Once the over-current threshold is reached, the latch 146 is turned off and the gate 157 is quickly discharged to a reverse potential. Bus current sense 152 is completely isolated from controller 154 and gate drive 140. As the current sense 152 responds to absolute value only, pin polarity is irrelevant. Sensing can be in the drain or source path of the switching power FET 156 or in some other remote section of the circuit. DC or AC currents can be sensed. Gate drive 158 is bipolar and completely isolated from all other pins of the device. Dual pins 132, 134 allow direct connection of the gate driver source to the external MOSFET 156. This feature enables direct use of N or P MOSFETs, in low or high side configurations. This design is applicable to: hot swapping of positive or negative high voltage systems, applications requiring bus isolation from the control, very high noise environments, and similar power switching applications.

Figure 11:
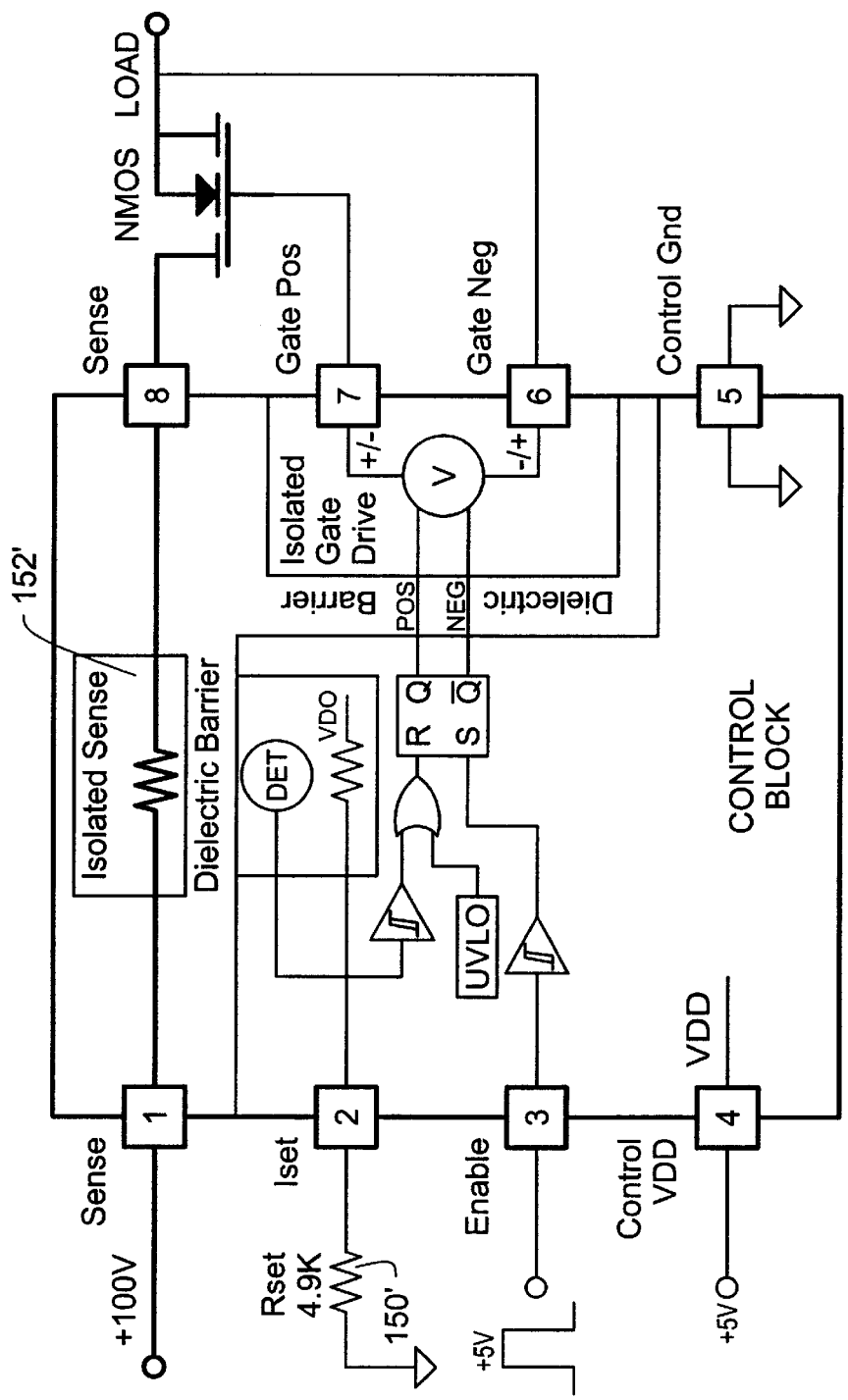
FIG. 11 illustrates a high voltage application of the circuit of FIG. 10.

FIG. 11 illustrates a high-voltage use of the device illustrated in FIG. 10. By setting the value of RSET 150' to 4.9 KΩ in FIG. 11, the trip current through the isolated sense 152' is set to 1 AMP in a high voltage hot swap controller. Similar configurations are applicable to hot swapping in a negative high voltage system or in an alternating current (AC) system.

Figure 12:
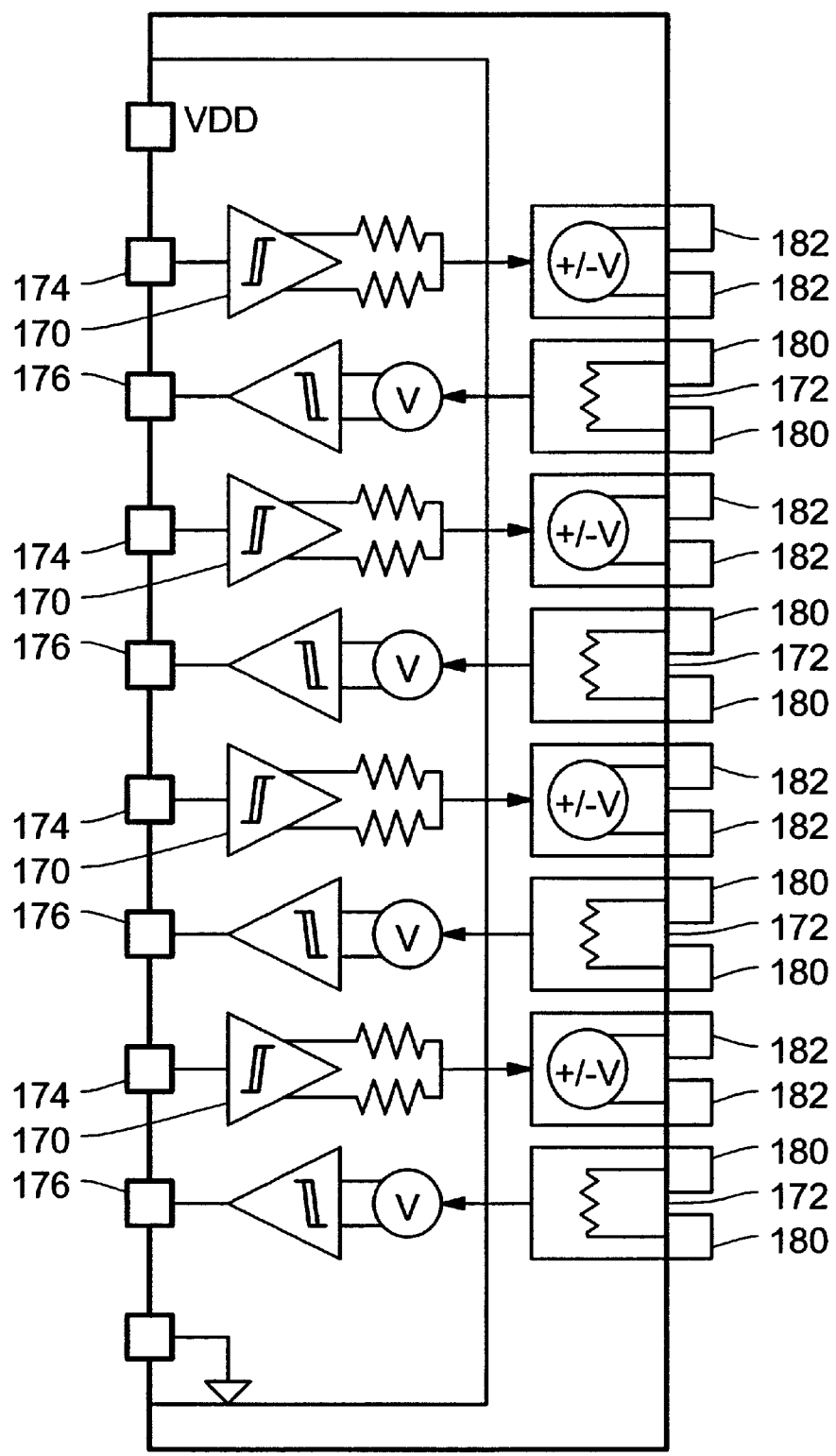
FIG. 12 is a block diagram of an integrated circuit to provide multiple isolators using an embodiment of the invention.

The comparator 75 may be incorporated into an integrated circuit multi-channel signal isolation product, for example as a replacement for discrete opto-couplers. The invention is less expensive than opto-electronics because it uses conventional processes and the chip area can be a small portion of the integrated circuit. An implementation of a quad bi-directional isolated interface to obtain complete dielectric isolation between functional blocks is shown in FIG. 12. The interface consists of four (4) single ended input to differential isolated, floating output circuits 170 and four (4) differential floating input to single ended open drain output circuits 172. The single ended inputs 174 and outputs 176 are powered from the VDD supply. The differential I/O 172 has channel to channel and power ground isolation. In the embodiment illustrated, all differential floating inputs 180 have an input resistance of 2 K ohms while the floating differential outputs 182 have a +/−1V swing with an output impedance of 50 k ohms. A microsecond response time is achieved using the differential isolated transducer. The multichannel isolated interface product is applicable to isolation of hot swap control inputs and outputs, to controlling power over the Ethernet, and to system communications link isolation and to areas where a high level of noise rejection is required.

Having described preferred embodiments of the invention it will now become apparent to those of ordinary skill in the art that other embodiments incorporating these concepts may be used. Accordingly, it is submitted that the invention should not be limited by the described embodiments but rather should only be limited by the spirit and scope of the appended claims.

What is claimed is:

1. An integrated differential current comparator formed on an integrated silicon device for providing input to output electrical isolation, said comparator comprising:

a first resistor disposed between a first contact point and a second contact point, said first resistor proximate to a silicon die, wherein said first resistor generates a first temperature when a first current passes between said first contact point and said second contact point;

a second resistor disposed between a third contact point and a fourth contact point, said second resistor spaced apart from said first resistor proximate to said silicon die, wherein said second resistor generates a second temperature when a second current passes between said third contact point and said fourth contact point;

a thermal difference sensor disposed on said silicon device, said first thermal difference sensor having a first temperature junction thermally coupled to said first resistor and a second temperature junction thermally coupled to said second resistor, said first thermal difference sensor providing a voltage between a first output and a second output, said voltage a function of a difference between said first temperature and said second temperature; and a dielectric barrier interposed between said first temperature junction and said first resistor and between said second temperature junction and said second resistor.

2. The integrated differential current comparator of claim 1 wherein said first and second temperature junctions comprise:

a first conductive material;

a second conductive material different from said first conductive material; and a contact between said first conductive material and said second conductive material wherein said contact ensures an electrical connection between said first conductive material and said second conductive material.

3. The integrated differential current comparator of claim 2 wherein said first conductive material is aluminum and said second conductive material is polysilicon.

4. The integrated differential current comparator of claim 2 wherein said first conductive material is aluminum and said second conductive material is copper.

5. The integrated differential current comparator of claim 1 wherein said first resistor and said second resistor are composed of polysilicon disposed in a dielectric layer containing said second conductive material.

6. The integrated differential current comparator of claim 1 wherein said first resistor and said second resistor are metallic and disposed in an inter-metal dielectric layer above said first conductive material.

7. The integrated differential current comparator of claim 1 wherein one of said first resistor and said second resistor is composed of polysilicon disposed in a dielectric layer containing said second conductive material and the other of said first resistor and said second resistor is disposed in an inter-metal dielectric layer above said first conductive material.

8. A high-gain integrated differential current comparator comprising a plurality of said thermal difference sensors of the integrated differential current comparator of claim 1 connected in series, wherein alternating thermal junctions of said thermal difference sensors are thermally coupled to said first resistor and said second resistor respectively.

9. The high-gain integrated differential current comparator according to claim 8, wherein said plurality of said thermal difference sensors has a geometric arrangement on said silicon device effective to cancel the effect of background thermal gradients on said silicon device.

10. The high-gain integrated differential current comparator of claim 9 wherein a voltage between said first output and said second output is equal to the product of a thermal-emf of said thermal difference sensor, a number of thermal junction pairs in said plurality of integrated differential current comparators and the difference between the power generated by said first resistor and the power generated by said second resistor.

11. An input-to-output signal isolation device formed on an integrated silicon device comprising:

a first resistor configured to carry an input current signal between an external source and an external ground;

a first output connected to a silicon device ground;

a plurality of first thermal junctions with a dielectric barrier interposed between said first thermal junctions and said first resistor, said first thermal junctions thermally coupled to said first resistor;

a second resistor configured to carry a reference signal between a logic threshold bias and said silicon device ground; and a plurality of second thermal junctions with a dielectric barrier interposed between said second thermal junctions and said second resistor, said second thermal junctions thermally coupled to said second resistor; wherein said plurality of first thermal junctions and said plurality of second thermal junctions are interconnected in an alternating fashion forming a series of thermal difference sensors disposed on said silicon device providing a voltage on a second output that is a function of the difference in power through said first resistor and said second resistor.

12. The input-to-output signal isolation device of claim 11 wherein connections to said external source and said external ground are protected by a spark gap.

13. A device that isolates a voltage drive from an input signal, said device formed on an integrated silicon device comprising:

a first resistor configured to carry a first current between a reference voltage and a silicon device ground when a first internal signal activates a first pulldown circuit;

a second resistor configured to carry a second current between a reference voltage and a silicon device ground when a second internal signal activates a second pulldown circuit; and a thermal difference sensor disposed on said silicon device, said thermal difference sensor having a plurality of first thermal junctions thermally coupled to and dielectrically isolated from said first resistor and a plurality of second thermal junctions thermally coupled to and dielectrically isolated from said second resistor, said thermal difference sensor providing a voltage between a first output and a second output, said voltage a function of the difference in power through said first resistor and said second resistor, said first output and said second output brought to pins external to said integrated silicon device.

14. An isolated high current monitoring device providing an internal control output, said device formed on an integrated silicon device, said isolated high current monitoring device comprising:

a first resistor configured to carry a high current between two external pins;

a second resistor configured to carry a reference current, wherein said first resistor is small compared to said second resistor; and a thermal difference sensor disposed on said silicon device, said thermal difference sensor having a plurality of first thermal junctions thermally coupled to and dielectrically isolated from said first resistor and a plurality of second thermal junctions thermally coupled to and dielectrically isolated from said second resistor, said thermal difference sensor providing a voltage between a first output and a second output, said voltage a function of the difference in power through said first resistor and said second resistor.

15. A hot swap control device configured in an integrated circuit comprising:

a current sense region encompassing a first resistor configured to carry a first current between pins of a package for said integrated circuit;

a sequencing region, isolated by dielectric from said current sense region, implementing logic functions to control application of power to an equipment being hot swapped and a thermal difference sensor, said thermal difference sensor comprising:
  a plurality of first thermal junctions thermally coupled to and dielectrically isolated from said first resistor;
  a second resistor connected in series with an external resistor between a reference voltage and a control ground providing a reference current; and
  a plurality of second thermal junctions thermally coupled to and dielectrically isolated from said second resistor; wherein said thermal difference sensor provides a voltage on an output when a current through said first resistor exceeds a current limit set by said external resistor, said output used to disable application of power; and
an output drive region, dielectrically isolated from said current sense region and said sequencing region, adapted to control application of power as directed from a set of outputs from said sequencing region.

16. The hot swap control device of claim 15 wherein said current limit is set to the product of constant and the ratio of said reference voltage to said external resistor.

17. A signal isolation product configured on an integrated circuit comprising:
  a plurality of single ended input to isolated differential floating output circuits comprising:
    a first resistor configured to carry a first current between a reference voltage and a integrated circuit ground when a first input is activated;
    a second resistor configured to carry a reference current; and
    a thermal difference sensor disposed on said integrated circuit, said thermal difference sensor having a plurality of first thermal junctions thermally coupled to and dielectrically isolated from said first resistor and a plurality of second thermal junctions thermally coupled to and dielectrically isolated from said second resistor, said thermal difference sensor providing a voltage between said isolated differential floating outputs, said voltage a function of the difference in power through said first resistor and said second resistor, said isolated differential floating outputs brought to pins external to said integrated circuit; and
  a plurality of isolated differential floating input to single ended open drain output circuits comprising:
    a first resistor configured to carry a first current between a first floating input pin and a second floating input pin;
    a second resistor configured to carry a reference current; and
    a thermal difference sensor disposed on said integrated circuit, said thermal difference sensor having a plurality of first thermal junctions thermally coupled to and dielectrically isolated from said first resistor and a plurality of second thermal junctions thermally coupled to and dielectrically isolated from said second resistor, said thermal difference sensor providing a single ended open drain output referenced to integrated circuit reference voltage, said voltage a function of the difference in power through said first resistor and said second resistor, said single ended open drain output brought to a pin external to said integrated circuit.

18. An integrated differential current comparator formed on an integrated semiconductor device for providing input to output electrical isolation, said comparator comprising:
  a first resistor disposed between a first contact point and a second contact point, said first resistor proximate to a semiconductor die, wherein said first resistor generates a first temperature when a first current passes between said first contact point and said second contact point;
  a second resistor disposed between a third contact point and a fourth contact point, said second resistor spaced apart from said first resistor proximate to said semiconductor die, wherein said second resistor generates a second temperature when a second current passes between said third contact point and said fourth contact point;
  a thermal difference sensor disposed on said semiconductor device, said first thermal difference sensor having a first temperature junction thermally coupled to said first resistor and a second temperature junction thermally coupled to said second resistor, said first thermal difference sensor providing a voltage between a first output and a second output, said voltage a function of a difference between said first temperature and said second temperature; and
  a dielectric barrier interposed between said first temperature junction and said first resistor and between said second temperature junction and said second resistor.

19. The integrated differential current comparator of claim 18 wherein said first and second temperature junctions comprise:
  a first conductive material;
  a second conductive material different from said first conductive material; and
  a contact between said first conductive material and said second conductive material wherein said contact ensures an electrical connection between said first conductive material and said second conductive material.

20. The integrated differential current comparator of claim 19 wherein said first conductive material is aluminum and said second conductive material is polysilicon.

21. The integrated differential current comparator of claim 18 wherein said first resistor and said second resistor are composed of polysilicon disposed in a dielectric layer containing said second conductive material.

22. The integrated differential current comparator of claim 18 wherein said first resistor and said second resistor are disposed in an inter-metal dielectric layer above said first conductive material.

23. A high-gain integrated differential current comparator comprising a plurality of said thermal difference sensors of the integrated differential current comparator of claim 18 connected in series, wherein alternating thermal junctions of said thermal difference sensors are thermally coupled to said first resistor and said second resistor respectively.

24. The high-gain integrated differential current comparator according to claim 23, wherein said plurality of said thermal difference sensors has a geometric arrangement on said semiconductor device effective to cancel the effect of background thermal gradients on said semiconductor device.

25. The high-gain integrated differential current comparator of claim 24 wherein a voltage between said first output and said second output is equal to the product of a thermal-emf of said thermal difference sensor, a number of thermal junction pairs in said plurality of integrated differential current comparators and the difference between the power generated by said first resistor and the power generated by said second resistor.

* * * * *